United States Patent
Jou et al.

(10) Patent No.: US 6,347,080 B2
(45) Date of Patent: *Feb. 12, 2002

(54) ENERGY BASED COMMUNICATION RATE DETECTION SYSTEM AND METHOD

(75) Inventors: Yu-Cheun Jou, San Diego; Amnon Silberger, La Jolla; Julien Nicolas, San Diego, all of CA (US)

(73) Assignee: Qualcomm, Inc., San Diego, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/150,493

(22) Filed: Sep. 9, 1998

(51) Int. Cl.[7] .............................. H04J 1/16; H04J 3/14; H04L 1/00; H04L 12/26; H04B 7/216

(52) U.S. Cl. ....................... 370/310; 370/252; 370/328; 370/335; 370/342; 455/422; 455/452; 455/522

(58) Field of Search ................................ 370/310, 252, 370/335, 331, 232, 342; 455/522, 422, 452; 375/200, 219, 335, 228, 316

(56) References Cited

U.S. PATENT DOCUMENTS

| | | | | |
|---|---|---|---|---|
| 5,703,902 A | * | 12/1997 | Ziv et al. | 375/200 |
| 5,771,226 A | * | 6/1998 | Kaku | 370/232 |
| 5,771,461 A | * | 6/1998 | Love et al. | 455/522 |
| 5,799,011 A | * | 8/1998 | LaRosa et al. | 370/355 |
| 5,884,187 A | * | 3/1999 | Ziv et al. | 455/522 |
| 5,946,346 A | * | 8/1999 | Ahmed et al. | 375/219 |
| 6,038,220 A | * | 3/2000 | Kang et al. | 370/252 |

FOREIGN PATENT DOCUMENTS

WO 9734439 9/1997 ............ H04Q/7/38

OTHER PUBLICATIONS

Shinya Tanaka, et al.; Pilot Symbol–Assisted Decision–Directed Coherent Adaptive Array Diversity for DS–CDMA Mobile Radio Reverse Link; Dec. 1997; IEICE Transactions on Fundamentals of Electronics, Communications and Computer Sciences; JP; Institute of Electronics Information and Comm. Eng. Tokyo; vol. E80–A, No. 12; pp. 2445–2453.

* cited by examiner

Primary Examiner—Wellington Chin
Assistant Examiner—M. Phan
(74) Attorney, Agent, or Firm—Philip R. Wadsworth; Gregory D. Ogrod

(57) ABSTRACT

A system and method for the detection of zero-rate communication frames on forward and reverse communication links is described herein. In a first embodiment, the rate determination process begins upon receiving pilot and traffic channel signals. The system then compares the received traffic channel energy with the pilot signal to obtain a metric. The metric is then compared with a predetermined threshold to detect the presence of a zero-rate traffic channel frame. In a second embodiment, the process begins with the receipt of a reverse communication link frame having first and second portions. The system then detects the energy contained in the first and second portions. The system compares the detected energy in the first portion with the detected energy in the second portion to obtain a metric. The system then compares the metric with a predetermined threshold to detect the presence of the zero-rate frame. The selection of the predetermined threshold in both embodiments is based on the probability of detection of a transmitted zero-rate frame and the probability of erroneously detecting a zero-rate frame.

8 Claims, 11 Drawing Sheets

ENERGY BASED COMMUNICATION RATE DETECTION SYSTEM AND METHOD

BACKGROUND OF THE INVENTION

I. Field of the Invention

The present invention relates generally to detection of data rates in communication signals. More specifically, the present invention relates to a system and method for detecting when zero-rate data frames in communication signals are received at a communications receiver.

II. Related Art

A typical satellite-based communications system comprises at least one terrestrial base station (hereinafter referred to as a gateway), at least one user terminal (for example, a mobile telephone), and at least one satellite for relaying communications signals between the gateway and the user terminal. The gateway provides links from a user terminal to other user terminals or communications systems, such as a terrestrial telephone system.

A variety of multiple access communications systems and techniques have been developed for transferring information among a large number of system users. These techniques include time division multiple access (TDMA), frequency division multiple access (FDMA), and code division multiple access (CDMA) spread-spectrum techniques, the basics of which are well known in the art. The use of CDMA techniques in a multiple access communications system is disclosed in U.S. Pat. No. 4,901,307, which issued Feb. 13, 1990, entitled "Spread Spectrum Multiple Access Communication System Using Satellite or Terrestrial Repeaters," and U.S. Pat. No. 5,691,974, which issued Nov. 25, 1997, entitled "Method and Apparatus for Using Full Spectrum Transmitted Power in a Spread Spectrum Communication System for Tracking Individual Recipient Phase Time and Energy", which are both incorporated herein by reference.

The above-mentioned patent documents disclose multiple access communications systems in which a large number of generally mobile or remote system users employ user terminals or mobile stations to communicate with other system users or users of other connected systems, such as a public telephone switching network. The user terminals communicate through gateways and satellites using CDMA spread-spectrum type communications signals.

Communications satellites form beams which illuminate "spots" produced by projecting satellite communications signals onto the Earth's surface. A typical satellite beam pattern comprises a number of beams arranged in a predetermined coverage pattern. Typically, a number of CDMA channels (also referred to as sub-beams), each occupying a different carrier frequency, are transmitted in a beam.

In a typical spread-spectrum communications system, a set of preselected pseudo-random noise (PN) code sequences is used to spread information signals over a predetermined spectral band prior to modulation onto a carrier frequency for transmission. PN spreading, a method of spread-spectrum transmission that is well known in the art, produces a signal for transmission that has a bandwidth much greater than that of the underlying data signal being transmitted. In a forward communications link (that is, in a communications link originating at a gateway and terminating at a user terminal), different PN spreading codes or binary sequences are used to distinguish signals transmitted by one or more gateways over different beams. These PN codes are shared by all communications signals within a given sub-beam.

In a typical CDMA spread-spectrum system, different channelizing codes are used to discriminate between signals intended for different user terminals within a sub-beam on the forward link. That is, a unique orthogonal code channel is provided for each user terminal on the forward link by using a unique "channelizing" orthogonal code. Walsh functions, or equivalent codes, are generally used to implement the channelizing codes.

Typical CDMA spread-spectrum communications systems, such as disclosed in U.S. Pat. No. 4,901,307, contemplate the use of coherent modulation and demodulation. In mobile communications systems using this approach, a "pilot" carrier signal (hereinafter referred to as a "pilot signal") is used as a phase reference for demodulation. When this approach is used on the forward link, a pilot signal, which typically contains no data modulation, is transmitted by a gateway throughout a coverage region. A single pilot signal is typically transmitted by each gateway for each beam on each frequency (sub-beam) used. These pilot signals are shared by all user terminals receiving signals from the gateway.

In the forward link, pilot signals are used by user terminals to obtain initial system synchronization and as a time, frequency, and phase reference for demodulating other signals transmitted by the gateway. Phase information obtained from a pilot signal is used as a carrier phase reference for coherent demodulation of other system signals or traffic signals. Since all forward link signals on a sub-beam are transmitted synchronously, this technique allows all traffic signals on a sub-beam to share a common pilot signal as a phase reference, providing for a less costly and more efficient signal acquisition or tracking mechanism.

When a user terminal is not involved in a two-way communications session (that is, the user terminal is not receiving and transmitting traffic signals simultaneously), the gateway can convey information to that particular user terminal using a signal channel known as a paging channel. For example, when a call has been placed to a particular mobile station or user terminal, phone, the gateway alerts the mobile station by means of a message on the paging channel. Paging channel messages are also used to distribute information about traffic channel assignments, access channel assignments, system configuration, and the like.

A user terminal can respond to a paging channel message by sending an access channel message over the reverse link (that is, the communications link originating at the user terminal and terminating at the gateway). The access channel is also used by a user terminal when it originates a call, that is requests that a communication link be established.

In a preferred embodiment, data on the forward and reverse links are transmitted at a variable rate. During conversations as well as data transmissions, there are often pauses and periods of intermittent activity that generate little information to be transmitted. On a duplex communication link, such as voice telephone links, often one party is speaking and the other is listening. For voice telephone links, therefore, one of the two links is idle almost half of the time, and can be transmitted using a lower data rate. Additionally, during pauses or periods of intermittent activity, data on forward and reverse links are transmitted at a lower rate. This lower data rate can approach or be equal to zero, that is, no data, in some situations.

Variable rate data transmission results in many benefits in a multiple access system. Detection of the transmitted signal by the receiver depends on signal energy. By decreasing the rate of data transmission, signal energy can be maintained with a lower average transmission power. This is very useful for power limited applications, such as in mobile transceivers. In such cases, reducing the average transmitter output power increases the time before power sources such as batteries must be recharged or replaced, and overall battery life. Additionally, lower power reduced rate transmission reduces the interference and background noise seen by other receivers on the sub-beam. Since transmitters are power controlled to maintain a constant signal energy to noise power ratio at the receiver, lower background noise power results in reduced signal energy requirements. Lower background noise power, therefore, allows other transmitters on the sub-beam to transmit at lower power. Reduced interference may also allow desired additional user capacity in a communication system.

What is needed, therefore, is a system and method that allow the transmission and detection of zero-rate data transmission on the forward and reverse communication links.

SUMMARY OF THE INVENTION

The present invention satisfies the above-mentioned needs by providing a system and method for the detection of zero-rate communication frames on forward and reverse communication links. The method for detecting a zero-rate traffic channel, comprises the steps of receiving a pilot channel frame and a traffic channel frame, measuring an energy of the traffic channel frame, measuring an energy of the pilot channel frame, and comparing the pilot channel frame energy to the traffic channel frame energy to obtain a metric. Generally, the frames are compared by computing a ratio of the traffic channel to the pilot channel frame energies. The metric is compared with a predetermined threshold to obtain a result, with the predetermined threshold being based on the probability of detection of a transmitted zero-rate traffic channel frame and the probability of erroneously detecting a zero-rate traffic channel frame. This is generally accomplished by comparing the magnitude of the metric to the magnitude of the predetermined threshold. Whether or not a zero-rate traffic channel frame has been received is indicated based on the result of the metric comparison. A zero-rate traffic channel frame is indicated as being received when the magnitude of the predetermined threshold exceeds the magnitude of the metric.

The system for detecting a zero-rate traffic channel comprises means for receiving the pilot and traffic channel frames, means for measuring an energy of the traffic channel frame, means for measuring an energy of the pilot channel frame, and means for comparing the pilot channel frame energy to the traffic channel frame energy to obtain a metric. Generally, this is accomplished using means for computing a ratio of the traffic and pilot channel frame energies. Means for comparing the metric with a predetermined threshold is used to obtain a comparison result, with the predetermined threshold being based on the probability of detection of a transmitted zero-rate traffic channel frame and the probability of erroneously detecting a zero-rate traffic channel frame. This is generally accomplished by using a means for comparing the magnitude of the metric to the magnitude of the predetermined threshold. As before, whether or not a zero-rate traffic channel frame has been received is indicated based on the result of the metric comparison. Means for indicating whether a zero-rate traffic channel frame has been received based on the result is used to make this indication. A zero-rate traffic channel frame is indicated as being received when the magnitude of the predetermined threshold exceeds the magnitude of the metric.

BRIEF DESCRIPTION OF THE DRAWINGS

The features and advantages of the present invention will become more apparent from the detailed description set forth below when taken in conjunction with the drawings in which like reference numbers indicate identical or functionally similar elements. Additionally, the left-most digits of a reference number identifies the drawing in which the reference number first appears.

DETAILED DESCRIPTION OF THE PREFERRED EMBODIMENTS

I. Introduction

The present invention is a system and method for detection of zero-rate data transmission in a communication signal. The present invention can be applied to CDMA or spread spectrum communications systems, as well as to other types of communications systems.

The preferred embodiment of the invention is discussed in detail below. While specific steps, configurations and arrangements are discussed, it should be understood that this is done for illustrative purposes only. Other steps, configurations and arrangements can be used without departing from the spirit and scope of the present invention.

The present invention will be described in three parts. First, a typical satellite communications system is described. Second, the zero-rate transmission detection system and method for a forward link are described. Third, the zero-rate transmission detection system and method for a reverse link are described.

II. An Exemplary Wireless Communications System

Figure 1:
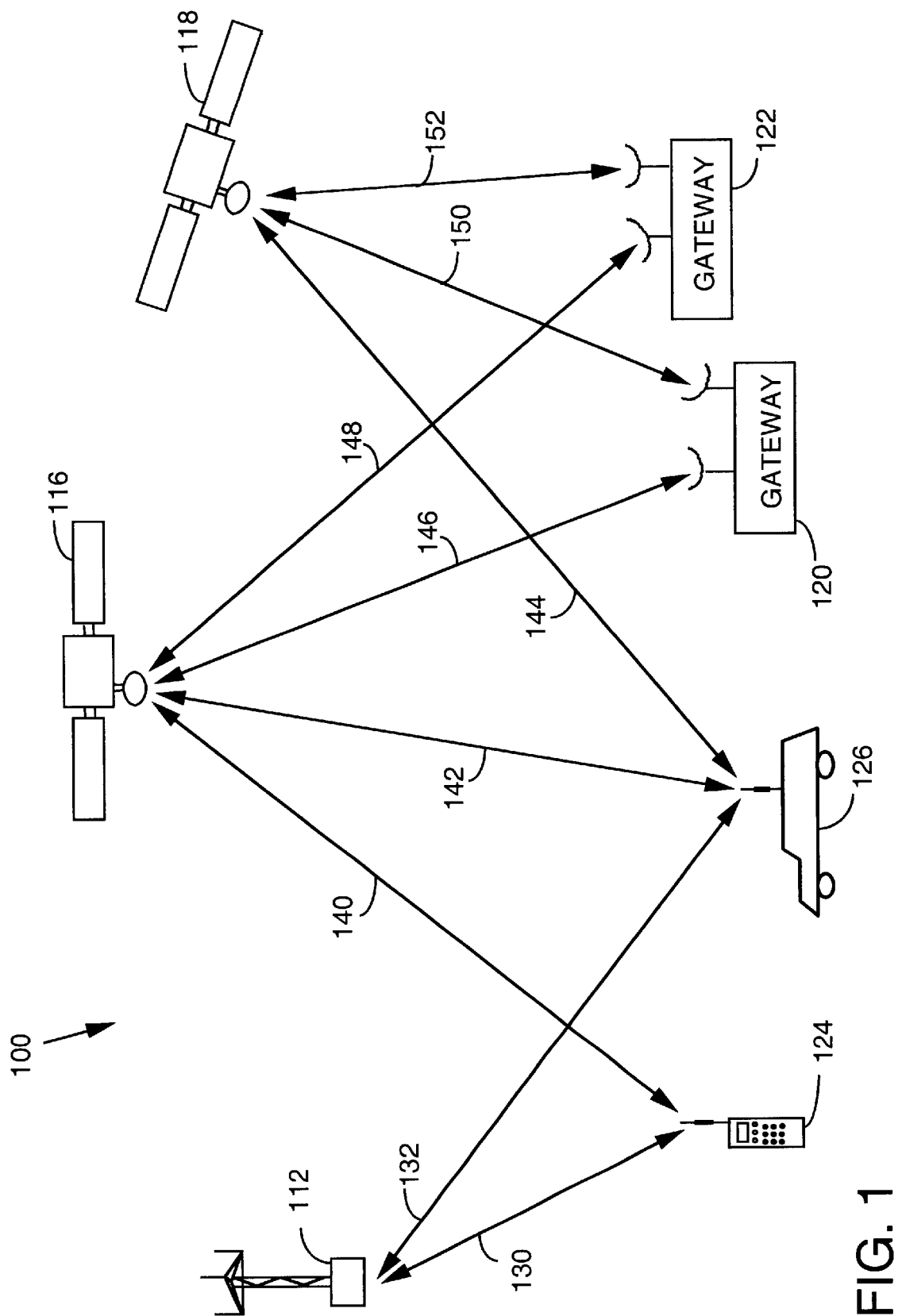
FIG. 1 depicts a typical wireless communication system.

An exemplary wireless communication system in which the present invention is useful is illustrated in FIG. 1. It is contemplated that this communication system uses CDMA type communication signals, but this is not required by the present invention. In a portion of a communication system 100 illustrated in FIG. 1, one base station 112, two satellites 116 and 118, and two associated gateways or hubs 120 and 122 are shown for effecting communications with two remote user terminals 124 and 126. Typically, the base stations and satellites/gateways are components of separate communication systems, referred to as being terrestrial- and satellite-based, although this is not necessary. The total number of base stations, gateways, and satellites in such systems depend on desired system capacity and other factors well understood in the art.

The terms "base station" and "gateway" are sometimes used interchangeably in the art, with gateways being perceived as specialized base stations that direct communications through satellites and have more 'functions,' with associated equipment, to establish and maintain such communication links through moving repeaters, while base stations use terrestrial antennas to direct communications within a surrounding geographical region. Central control centers will also typically have more functions to perform when interacting with gateways and satellites. User terminals are also sometimes referred to as subscriber units, mobile units, mobile stations, or simply "users," "mobiles," or "subscribers" in some communication systems, depending on preference.

User terminals 124 and 126 each include a wireless communication device such as, but not limited to, a cellular telephone, a data transceiver, or a paging or position determination receiver, and can be hand-held or vehicle-mounted as desired. Here, the user terminals are illustrated as hand-held telephones. However, it is also understood that the teachings of the invention are applicable to fixed units where remote wireless service is desired, including "indoor" as well as "open air" locations.

Generally, beams from satellites 116 and 118 cover different geographical areas in predefined patterns. Beams at different frequencies, also referred to as CDMA channels or "sub-beams," can be directed to overlap the same region. Beam coverage or service areas for multiple satellites, or antenna patterns for multiple base stations, can be designed to overlap completely or partially in a given region depending on the communication system design and the type of service being offered, and whether space diversity is being achieved.

A variety of multi-satellite communication systems have been proposed with an exemplary system employing on the order of 48 or more satellites, traveling in eight different orbital planes in LEO orbits for servicing a large number of user terminals. However, those skilled in the art will readily understand how the teachings of the present invention are applicable to a variety of satellite system and gateway configurations, including other orbital distances and constellations. At the same time, the invention is equally applicable to terrestrial-based systems of various base station configurations.

In FIG. 1, some possible signal paths are illustrated for communications being established between user terminals 124 and 126 and base station 112, or through satellites 116 and 118, with gateways 120 and 122. The base station-user terminal communication links are illustrated by lines 130 and 132. The satellite-user terminal communication links between satellites 116 and 118, and user terminals 124 and 126 are illustrated by lines 140, 142, and 144. The gateway-satellite communication links, between gateways 120 and 122 and satellites 116 and 118, are illustrated by lines 146, 148, 150, and 152. Gateways 120 and 122, and base station 112, may be used as part of one- or two-way communication systems or simply to transfer messages or data to user terminals 124 and 126.

Figure 2:
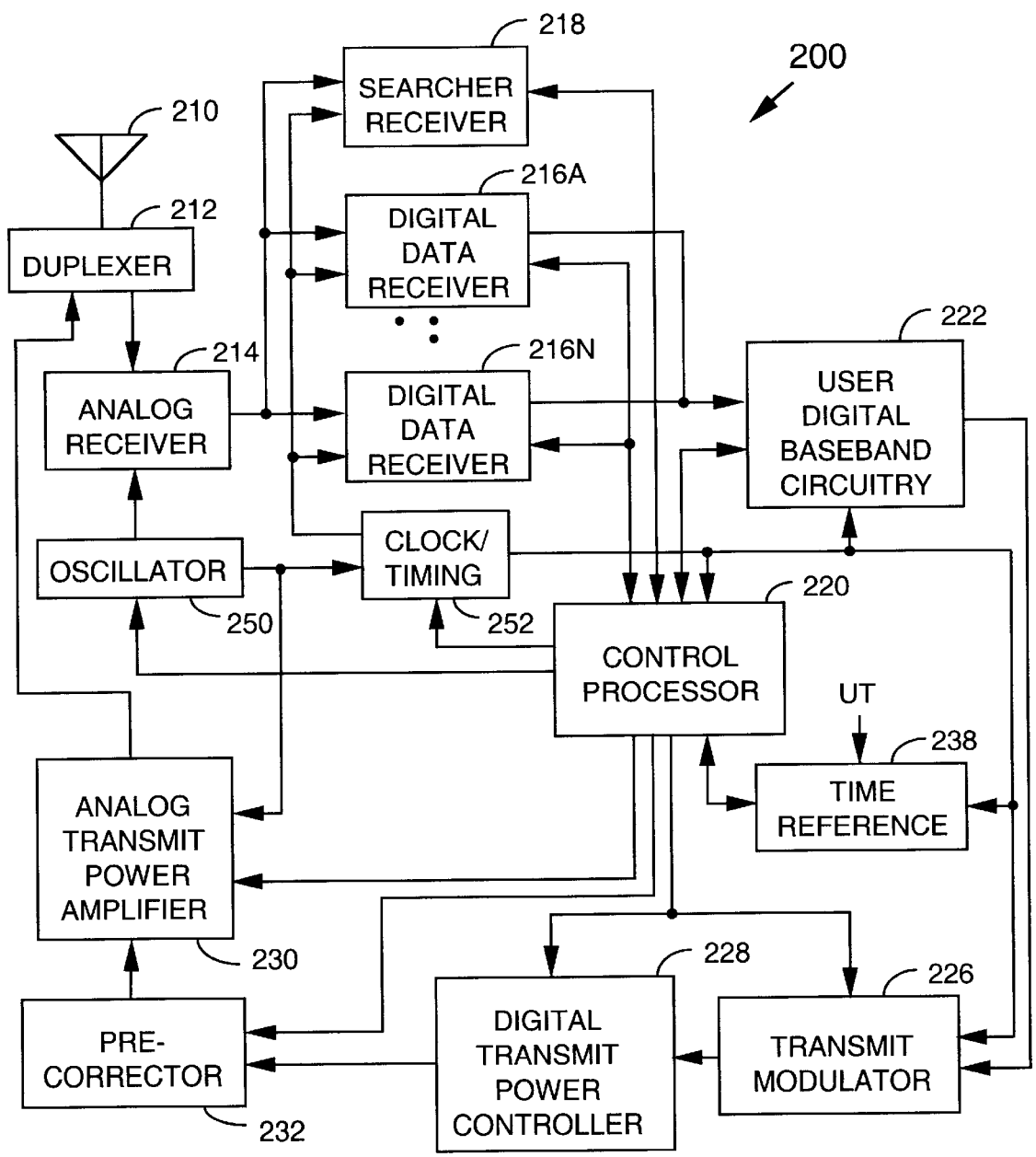
FIG. 2 is a block diagram of an exemplary transceiver for use in a user terminal.

An exemplary transceiver 200 for use in a user terminal 106 is illustrated in FIG. 2. Transceiver 200 uses at least one antenna 210 for receiving communication signals, which are transferred to an analog receiver 214, where they are downconverted, amplified, and digitized. A duplexer element 212 is typically used to allow the same antenna to serve both transmit and receive functions. However, some systems employ separate antennas for operating at different transmit and receive frequencies.

The digital communication signals output by analog receiver 214 are transferred to at least one digital data receiver 216A and at least one searcher receiver 218. Additional digital data receivers 216B–216N can be used to obtain desired levels of signal diversity, depending on the acceptable level of transceiver complexity, as would be apparent to one skilled in the relevant art.

At least one user terminal control processor 220 is coupled to digital data receivers 216A–216N and searcher receiver 218. Control processor 220 provides, among other functions, basic signal processing, timing, power and hand-off control or coordination, and selection of frequency used for signal carriers. Another basic control function often performed by control processor 220 is the selection or manipulation of pseudonoise (PN) code sequences or orthogonal functions to be used for processing communication signal waveforms. Signal processing by control processor 220 can include a determination of relative signal strength and computation of various related signal parameters. Such computations of signal parameters, such as timing and frequency may include the use of additional or separate dedicated circuitry to provide increased efficiency or speed in measurements or improved allocation of control processing resources.

The outputs of digital data receivers 216A–216N are coupled to digital baseband circuitry 222 within the user terminal. User digital baseband circuitry 222 comprises processing and presentation elements used to transfer information to and from a user of a user terminal. That is, signal or data storage elements, such as transient or long term digital memory; decoders; input and output devices such as display screens, speakers, keypad terminals, and handsets; A/D and D/A elements, vocoders and other voice and analog signal processing elements; etc., all form parts of the user digital baseband circuitry 222 using elements well known in the art. If diversity signal processing is employed, user digital baseband circuitry 222 can comprise a diversity combiner and decoder. Some of these elements may also operate under the control of, or in communication with, control processor 220.

When voice or other data is prepared as an output message or communications signal originated by the user terminal, user digital baseband circuitry 222 is used to receive, store, process, and otherwise prepare the desired data for transmission. User digital baseband circuitry 222 provides this data to a transmit modulator 226 operating under the control of control processor 220. The output of transmit modulator 226, along with the data rate to be transmitted, is transferred to a power controller 228 which provides output power control to a transmit power amplifier 230 for final transmission of the signal from antenna 210 to a gateway.

Digital receivers 216A–N are configured with signal correlation elements to demodulate and track specific signals. Searcher receiver 218 is used to search for pilot signals, or other relatively fixed pattern strong signals, while digital receivers 216A–N are used to demodulate other signals associated with detected pilot signals. Therefore, the outputs of these units can be monitored to determine the energy in, or frequency of, the pilot signal or other signals. These receivers also employ frequency tracking elements that can be monitored to provide current frequency and timing information to control processor 220 for signals being demodulated.

Figure 3:
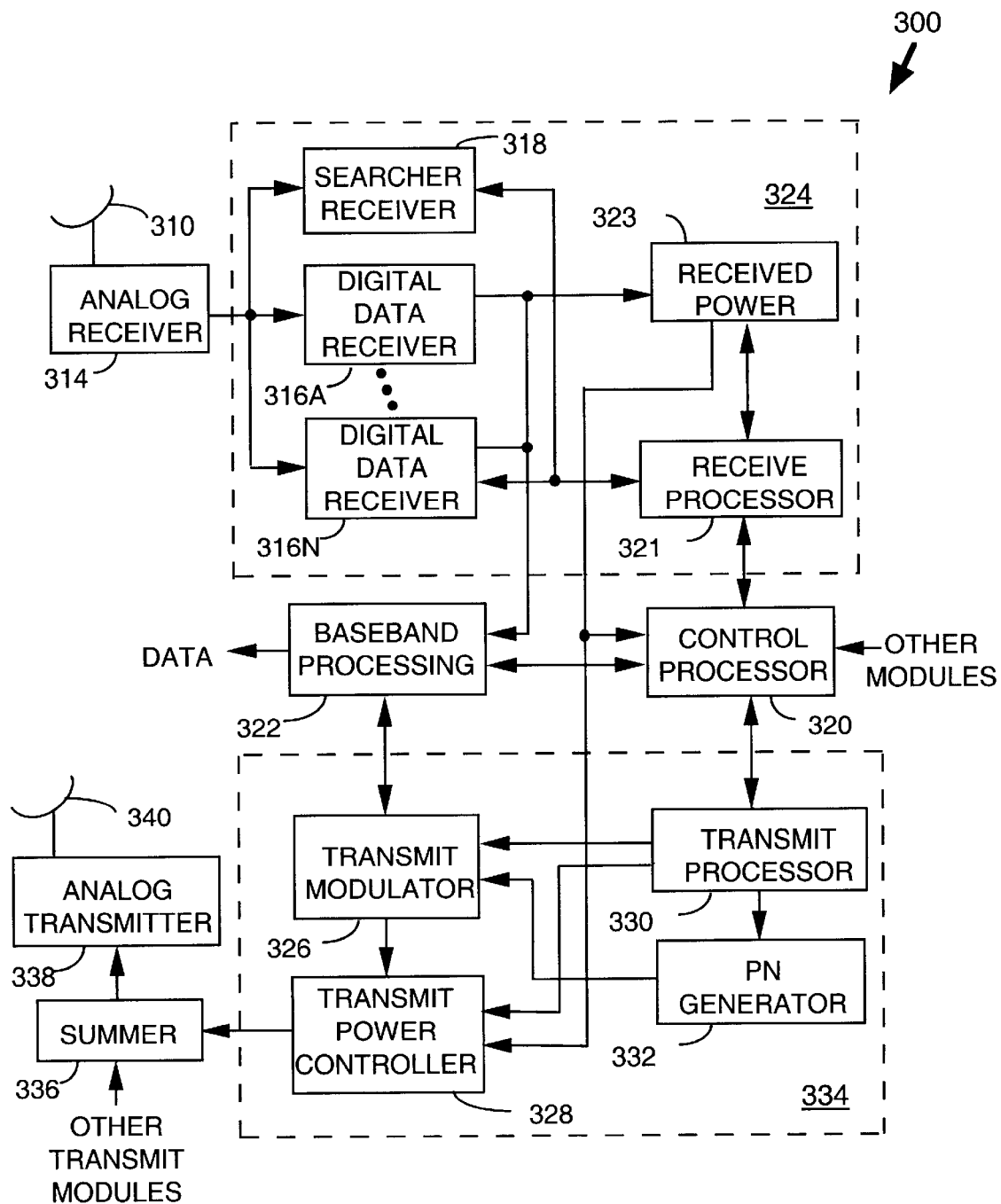
FIG. 3 is a block diagram of an exemplary transmission and reception apparatus for use in a gateway.

An exemplary transmission and reception apparatus 300 for use in gateways 120 and 122 is illustrated in FIG. 3. The portion of gateway 120, 122 illustrated in FIG. 3 has one or more analog receivers 314 connected to an antenna 310 for receiving communication signals which are then downconverted, amplified, and digitized using various schemes well known in the art. Multiple antennas 310 are used in some communication systems. Digitized signals output by analog receiver 314 are provided as inputs to at least one digital receiver module, indicated by dashed lines generally at 324.

Each digital receiver module 324 corresponds to signal processing elements used to manage communications between a gateway 120, 122 and one user terminal 124, 126, although certain variations are known in the art. One analog receiver 314 can provide inputs for many digital receiver modules 324, and a number of such modules are typically used in gateways 102, 122 to accommodate user terminal signals from all of the satellite beams and possible diversity mode (multipath) signals being handled at any given time. Each digital receiver module 324 has one or more digital data receivers 316 and a searcher receiver 318. Searcher receiver 318 generally searches for appropriate diversity modes of signals. Where implemented in the communication system, multiple digital data receivers 316A–316N are used for diversity signal reception.

The outputs of digital data receivers 316 are provided to subsequent baseband processing elements 322 comprising apparatus well known in the art and not illustrated in further detail here. Exemplary baseband apparatus includes diversity combiners and decoders to combine multipath signals into one output for each subscriber and to decode the information bits. Exemplary baseband apparatus also includes interface circuits for providing output data, typically to a digital switch or network. A variety of other known elements such as, but not limited to, vocoders, data modems, and digital data switching and storage components may form a part of baseband processing elements 322. These elements operate to control or direct the transfer of data signals to one or more transmit modules 334.

Signals to be transmitted to user terminals are each coupled to one or more appropriate transmit modules 334. A typical gateway uses a number of such transmit modules 334 to provide service to many user terminals 124, 126 at a time, and for several satellites and beams at a time. The number of transmission modules 334 used by gateway 120, 122 is determined by factors well known in the art, including system complexity, number of satellites in view, subscriber capacity, degree of diversity chosen, and the like.

Each transmit module 334 includes a received power unit 323 for detecting the power levels in received signals. Each transmit module 334 also includes a transmit modulator 326 which spread-spectrum modulates data for transmission. Transmit modulator 326 has an output coupled to a digital transmit power controller 328, which controls the transmission power used for the outgoing digital signal. Digital transmit power controller 328 applies a minimum level of power for purposes of interference reduction and resource allocation, but applies appropriate levels of power when needed to compensate for attenuation in the transmission path and other path transfer characteristics. A PN generator 332 is used by transmit modulator 326 in spreading the signals. This code generation can also form a functional part of one or more control processors or storage elements used in gateway 122, 124.

The output of transmit power controller 328 is transferred to a summer 336 where it is summed with the outputs from other transmit modules. Those outputs are signals for transmission to other user terminals 124, 126 at the same frequency and within the same beam as the output of transmit power controller 328. The output of summer 336 is provided to an analog transmitter 338 for digital-to-analog conversion, conversion to the appropriate RF carrier frequency, further amplification and output to one or more antennas 340 for radiating to user terminals 124, 126. Antennas 310 and 340 may be the same antennas depending on the complexity and configuration of the system.

At least one gateway control processor 320 is coupled to receiver modules 324, transmit modules 334, and baseband circuitry 322; these units may be physically separated from each other. Control processor 320 provides command and control signals to effect functions such as, but not limited to, signal processing, timing signal generation, power control, handoff control, diversity combining, and system interfacing. In addition, control processor 320 assigns PN spreading codes, code timing, orthogonal code sequences, and specific transmitters and receivers for use in subscriber communications.

Control processor 320 also controls the generation and power of pilot, sync, and paging channel signals and their coupling to transmit power controller 328. The pilot channel is simply a signal that is not modulated by data, and may use a repetitive unchanging pattern or non-varying frame structure type input (pattern) into transmit modulator 326. That is, the orthogonal function, here preferably a Walsh code, used to form the channel for the pilot signal generally has a constant value, such as all 1's or 0's, or a well known repetitive pattern, such as a structured pattern of interspersed 1's and 0's. This effectively results in transmitting only the PN spreading codes applied from PN generator 332. In addition, a pilot signal is not power controlled. That is, the pilot signal is transmitted at a preselected fixed power level which is not varied so that accurate measurements of signal power are achieved by user terminals.

While control processor 320 can be coupled directly to the elements of a module, such as transmit module 324 or receive module 334, each module generally comprises a module-specific processor, such as transmit processor 330 or receive processor 321, which controls the elements of that module. Thus, in a preferred embodiment, control processor 320 is coupled to transmit processor 330 and receive processor 321, as shown in FIG. 3. In this manner, a single control processor 320 can control the operations of a large number of modules and resources more efficiently. Transmit processor 330 controls generation of, and signal power for, pilot, synchronization, paging signals, and traffic channel signals, and their respective coupling to power controller 328. Receiver processor 321 controls searching, PN spreading codes and timing used for demodulation, and monitoring received power.

For certain operations, such as shared resource power control, gateways 120 and 122 receive information such as received signal strength, frequency measurements, or other received signal parameters from user terminals in communication signals. This information can be derived from the demodulated outputs of data receivers 316 by receive processors 321. Alternatively, this information can be detected as occurring at predefined locations in the signals being monitored by control processor 320, or receive processors 321, and transferred to control processor 320. Control processor 320 uses this information to control the timing and frequency of signals being transmitted and processed using transmit power controllers 328 and analog transmitter 338.

A preferred embodiment of the invention is discussed in detail below. While specific steps, configurations and arrangements are discussed, it should be understood that this is done for illustrative purposes only. Other steps, configurations and arrangements can be used without departing from the spirit and scope of the present invention. The present invention could find use in a variety of wireless information and communication systems, including those intended for position determination, and satellite and terrestrial cellular telephone systems.

III. Forward Link Zero-rate Frame Detection

In communications systems, data is transmitted at various rates, dependent on demand and communication system capacity. For example, in voice transmissions, normally only one party talks at a time. One channel, therefore, will have most of the activity while the other is inactive. In order to save power and bandwidth, and reduce interference with other channels, the inactive channel is transmitted at a much lower rate. In the exemplary environment, data can be transmitted at 9600 bits per second (bps), 4800 bps, 2400 bps and zero bps, or zero rate. For periods of inactivity on a channel, the zero-rate transmission is preferred in order to save power and decrease interference with other channels.

Two factors that are affected by increased transmission rate are bit transmission power ($P_b$) and bit transmission duration ($T_b$). The quality of the received signal depends on the ratio of energy of the received bit ($E_b$) to noise power spectral density ($N_0$) or ($E_b/N_0$). For the purposes of explanation, noise power spectral density ($N_0$) will be assumed to be constant. The energy of the received bit ($E_b$) is a function of transmit power of the transmitted bit ($P_b$), and the duration of the transmitted bit ($T_b$). The relationship between the energy of the received bit ($E_b$), transmit power of the transmitted bit ($P_b$), and the duration of the transmitted bit ($T_b$) is given by:

$$E_b = P_b T_b$$

As the rate of transmission is increased, the duration of the transmitted bit ($T_b$) necessarily decreases. Thus, the width of each bit decreases as the rate of transmission increases. Consequently, in a 20 millisecond data or signal frame, 192, 96, and 48 bits can fit into a frame at 9600, 4800 and 2400 bps, respectively.

In order to maintain the quality of the received signal (assuming constant noise power ($N_0$)), the energy of the received bit ($E_b$) must be maintained at a constant level. To maintain constant energy of the received bit ($E_b$) for an increased transmission rate, which results in decreased duration of the transmitted bit ($T_b$), transmission power ($P_b$) must be increased.

A forward link is used to transmit user and signaling information from a gateway to a user terminal during a call. The forward link comprises a pilot channel and a forward traffic channel. The forward traffic channel carries user and signaling traffic from a gateway to a user terminal during a call. The pilot channel carries timing information that allows a user terminal to obtain and maintain time, phase and frequency synchronization with the gateway.

The forward traffic channel carries data at different possible rates. In a preferred embodiment, the different possible rates are 9600 bits per second (bps), 4800 bps, 2400 bps, and 0 bps, or zero rate. The data rate of each frame transmitted on the forward traffic channel is selected on a frame by frame basis. The selection of the data rate for each frame can be based upon, among other things, communication system administration, the amount of information to be communicated to a user terminal, the amount of bandwidth available for data transmission at the transmitter, and so forth.

In a CDMA system, the pilot channel is a direct-sequence signal transmitted continuously by a gateway on the forward link. The pilot channel allows a user terminal to acquire the timing of the forward link, provides a phase reference for coherent demodulation, and provides a means for signal strength comparison between beams, satellites or gateways for determining when to hand off. Since the pilot channel is transmitted at a constant rate, the transmit power is not varied as a function of data transmission rate.

Figure 4:
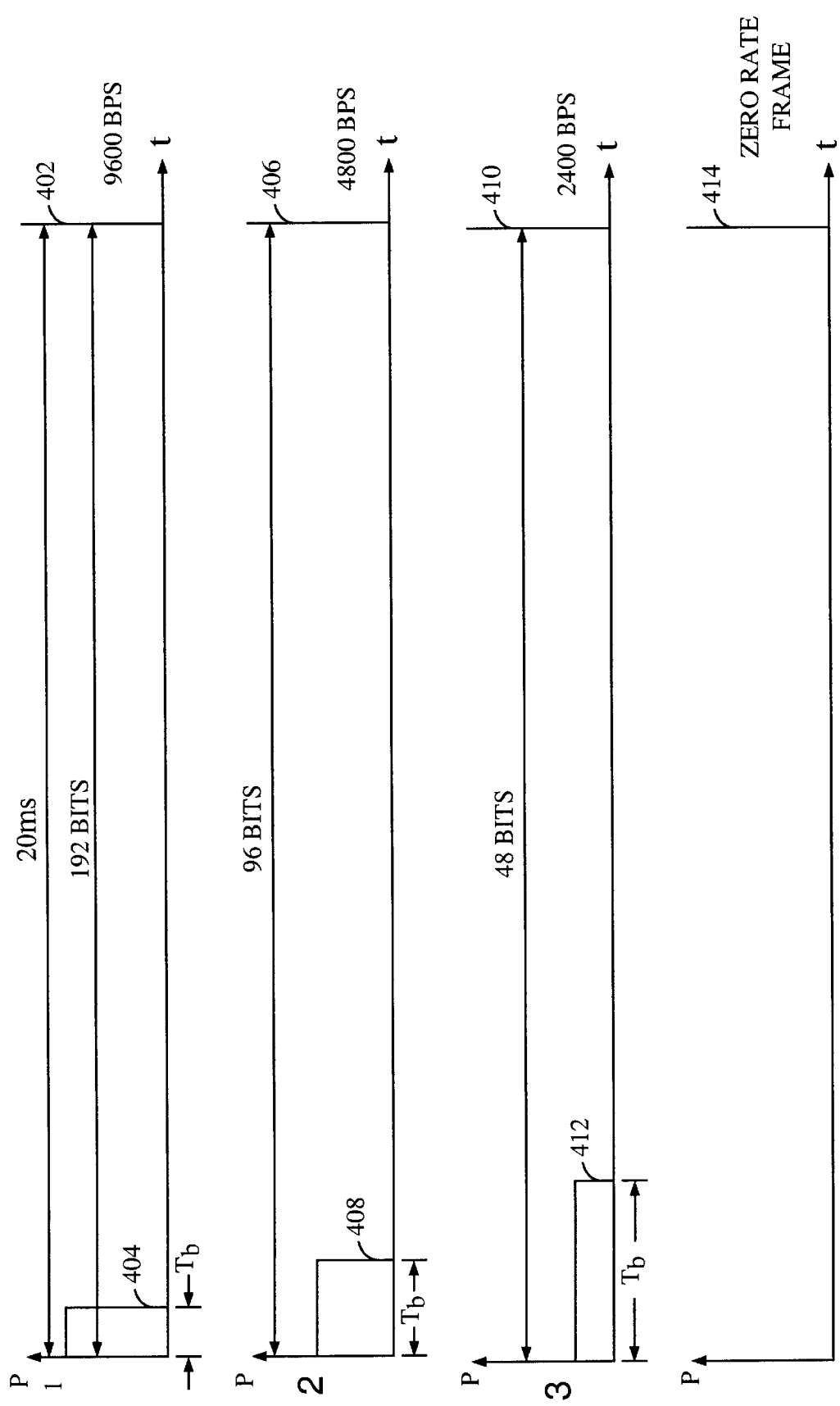
FIG. 4 illustrates the relationship between data transmission rate and transmission power.

FIG. 4 illustrates the relationship between data transmission rate and transmission power. Traffic channel frames 402, 406, 410 and 414 illustrate four 20 millisecond length traffic channel frames of different transmission rates. Traffic channel frame 402 illustrates a 9600 bps communication frame. The 9600 bps traffic channel frame 402 can contain up to 192 bits of information. Bit 404 is an example of one such bit. For explanatory purposes, the transmit power of exemplary bit 404 has been normalized to 1. Traffic channel frame 406 is an example of a 4800 bps traffic channel frame. Traffic channel frame 406 can contain up to 96 signal bits. Bit 408 is an example of one such bit. Bit 408 has twice the duration ($T_b$) of bit 404, and the transmit power is reduced to one-half in order to maintain constant bit energy ($E_b$). Communication frame 410 exemplifies the 2400 bps frame. 2400 bps signal bit 412 is four times as wide as the 9600 bps signal bit 404. Since signal bit 412 has a duration of four times the signal bit of 404, the transmit power for signal bit 412 is reduced to one-quarter. Traffic channel frame 414 exemplifies a forward link zero-rate frame, in which no bits or energy (from data) are transmitted.

On the forward link, zero-rate frames are detected by monitoring the traffic and pilot channel signal energy. If traffic and pilot channel signal energy are detected, then the frame received is determined to be a non-zero-rate frame. If no traffic channel energy is detected, on the other hand, the frame may be a zero-rate frame or a non-zero-rate frame whose signal energy has been faded by effects occurring in the signal transfer path or channel.

To determine if a traffic channel frame is a zero-rate frame, the traffic and pilot channel signal energies are compared. The traffic and pilot channel signals are transmitted in the same band and the pilot channel is transmitted constantly. Fading on the forward link, therefore, will result in fading on both the traffic and pilot channels. If, for example, the traffic channel fades, the pilot channel will also fade; if noise dominates the traffic channel, then noise will dominate the pilot channel. If pilot channel energy is detected and no traffic channel energy is detected, it can be determined that a zero-rate frame has been transmitted. If no pilot channel energy is detected and no traffic channel energy is detected, it can be determined that the forward link has faded and it is impossible to determine whether a zero or regular non-zero-rate frame has been transmitted.

The present invention detects zero-rate frames on the forward link by generating a metric ($M_f$) based on the energy of the traffic channel relative to the pilot channel. The metric ($M_f$) is compared to a predetermined threshold to determine whether or not a zero-rate frame has been received. The metric is governed by the relationship:

$$M_f = \frac{\text{traffic channel frame energy}}{\text{pilot channel frame energy}}$$

When a zero-rate frame is transmitted no data bits are transmitted on the traffic channel, resulting in no transmitted traffic channel energy. Since the pilot channel is transmitted continuously, the pilot channel contains energy even when a zero-rate frame is transmitted on the traffic channel. In a noiseless communication system, when a zero-rate frame is transmitted, no traffic channel frame energy and a normal amount of pilot channel frame energy both exist on the forward link. Due to noise, however, the estimated traffic energy during a zero-rate frame will be non-zero.

If a zero-rate frame has been transmitted, computation of the forward link metric ($M_f$) will result in a small number. If, on the other hand, the entire channel is faded, both traffic channel and pilot channel energy will be detected and the forward link metric ($M_f$) will be a value closer to 1. By comparing the forward link metric ($M_f$) with a predetermined threshold, the receiver in the forward link can determine if the current frame is a zero-rate frame.

Deciding where to set the threshold for the forward link metric ($M_f$) to indicate a zero-rate frame is a typical signal detection problem. When the threshold is set very low, the probability of erroneously detecting a zero-rate frame decreases. Setting the predetermined threshold low, however, also decreases the probability of successfully detecting a zero-rate frame. When the predetermined threshold is set at a higher level, the probability of detecting a zero-rate frame increases. With a higher predetermined threshold, however, the probability of erroneously detecting a zero-rate frame increases. The predetermined threshold, therefore, will be chosen by determining a ratio of the probability of erroneously detecting a zero-rate frame to the probability of detecting a zero-rate frame for each particular system or communications network on which the zero rate frame detection method and system is implemented.

Figure 5:
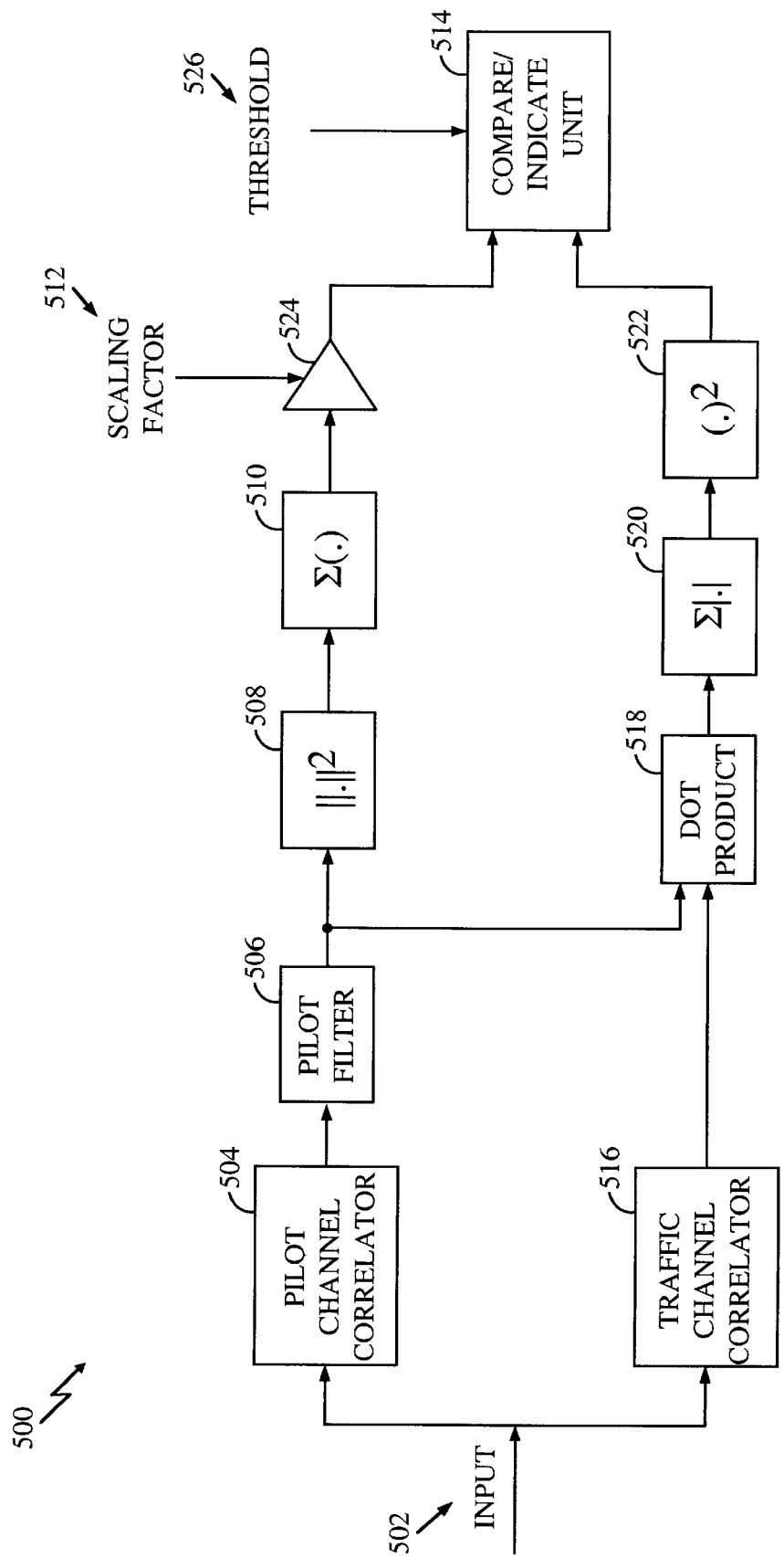
FIG. 5 is a block diagram of an exemplary forward link zero-rate frame detector.

FIG. 5 illustrates a forward link zero-rate frame detector 500. In a preferred embodiment, the zero-rate frame detector 500 is incorporated in one of the digital data receivers 216A–216N of user terminal 200. The pilot and traffic channel signals are input to the input of the zero-rate frame detector 500 at input 502. The forward link zero-rate frame detector 500 comprises two processing branches, one for the pilot channel signal and one for the traffic channel signal. Correlators 504 and 516 separate the pilot and traffic channel signals from input signal 502. Pilot filter 506 performs an addition and averaging function with the known pilot channel signal to reduce the noise energy in the received pilot signal. The correlated traffic channel signal from traffic channel correlator 516 and the filtered pilot channel signal from pilot filter 506 are input into dot product unit 518. Since both pilot and traffic channel signals are transmitted on the same RF channel, any multipath phase rotation will appear in both the pilot and traffic channel signals. The dot product unit 518 effectively removes phase rotation from the traffic channel signal by producing a dot product between the traffic channel signal and the pilot channel signal. The output of dot product unit 518 is a coherent traffic channel signal with no phase error. Summer 520 sums the output of dot product unit 518 over an entire frame. The output of summer 520 is then squared at squaring unit 522 to determine the energy of the traffic channel signal.

In the pilot channel signal branch, after the pilot channel signal has been filtered at pilot filter 506, the pilot channel signal is then squared at squaring unit 508 to determine the energy of the pilot channel signal. The pilot channel signal energy is then summed over an entire frame at summer 510. After the pilot channel energy has been summed over a frame by summer 510, the pilot channel signal energy is then scaled at scaler 524 by scaling factor 512 ($\alpha_r$). The fixed scaling factor 512 compensates for channel and system conditions that may affect the traffic channel frame energy to pilot channel frame energy ratio. Both pilot channel and traffic channel signal energies are then input into comparison/indication unit 514. The comparison/indication unit 514 compares the ratio of traffic channel signal energy to pilot channel signal energy to a threshold 526. If the ratio of traffic channel signal energy to pilot channel signal energy is lower than threshold 526, the received traffic channel frame is a zero-rate frame. Alternatively, if the ratio of traffic channel signal energy to pilot channel signal energy is higher than threshold 526, the received traffic channel frame is a non-zero-rate frame. Comparison/indication unit 514 then indicates the zero or non-zero-rate traffic channel frame to the digital data receivers 216A–216N.

Figure 6:
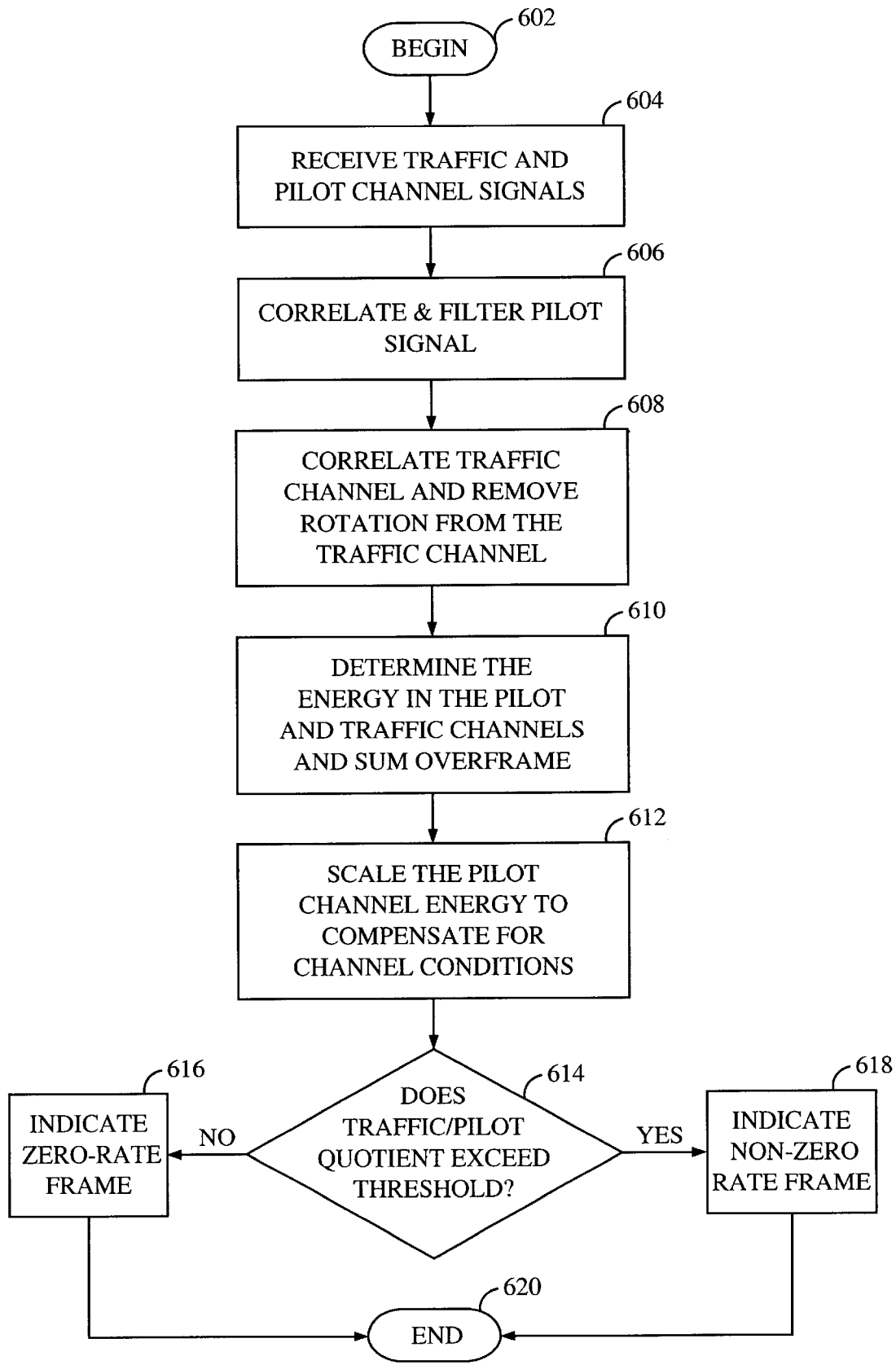
FIG. 6 is a flow chart depicting the method of detecting zero-rate frames on the forward link.

FIG. 6 illustrates the method for detecting a zero-rate frame on the forward link. The method begins at step 602 where the traffic and pilot channel signals are input to the zero-rate frame detection unit 500. The traffic and pilot channel signals are received at step 604 by pilot and traffic channel signal correlators 504 and 516. The pilot channel signal is then correlated and filtered in step 606 by pilot correlator 504 and pilot filter 506. The traffic channel signal is correlated and de-rotated in step 608 by traffic channel signal correlator 516 and dot product unit 518. At step 610, the energy is then determined for the pilot and traffic channel signals by squaring units 508, 522 and summed over a frame by summing units 510, 520. The pilot channel signal energy is then scaled at step 612 to compensate for channel and system conditions by scaling factor 512 and scaling unit 524.

Forward link metric ($M_f$) is then calculated and compared with the predetermined threshold 526 at step 614 by compare indication unit 514. If the quotient exceeds the threshold at step 614, then the method indicates a non-zero-rate frame at step 618. If, on the other hand, the traffic channel signal energy to pilot channel signal energy quotient is determined to be less than the pre-determined threshold at step 614, then a zero-rate frame is indicated at step 616. After the indication of a zero or non-zero-rate frame at steps 616 or 618, the process ends at step 620.

IV. Reverse Link Zero-rate Frame Detection

A reverse link is used to transmit user and signaling information from a user terminal to a gateway during a call. The reverse link comprises a reverse traffic channel for carrying the user and signaling traffic from the user terminal to the gateway during a call. There is no pilot channel on the reverse link.

The reverse traffic channel carries information at different possible rates. In a preferred embodiment, the different possible rates comprise rates of 9600 bits per second (bps), 4800 bps, 2400 bps, and zero bps. The data rate of each frame transmitted on the reverse traffic channel is selected on a frame by frame basis. This selection of the data rate for each frame can be based upon, among other things, communication system administration, the amount of information to be communicated to a gateway, the amount of band width available for data transmission at the transmitter, and so forth.

Since the reverse link does not include a pilot channel, the reverse link relies on the reverse traffic channel to maintain time, phase and frequency synchronization for coherent demodulation at the receiver. The reverse traffic channel, therefore, must be transmitted continuously in order to maintain the reverse link communications channel. If a gateway loses the reverse traffic channel, the communications link between the user terminal and the gateway is lost, resulting in a dropped call.

The system and method of the invention for detecting zero-rate frames on the reverse link is different from the detection of zero-rate frames on the forward link. Since there is no pilot channel on the reverse link, it is not possible to detect a zero-rate frame by comparing the energy of the pilot channel with that of the traffic channel.

The user terminal transmits zero-rate frames by transmitting a predetermined code in a pseudo randomly placed portion of the reverse traffic channel frame. In the remainder of the frame, nothing is transmitted. The interval in which the predetermined code is transmitted is called the "hot zone" and the interval in which nothing is transmitted is called the "cold zone." The hot zone transmission allows the gateway receiver to maintain time and frequency synchronization, as well as signal lock in order to maintain the reverse communications link. In a preferred embodiment, the 20 millisecond reverse traffic frame is divided into four intervals, each of 5 millisecond duration. In a preferred embodiment, the user terminal transmits the preselected code at 2400 bps, at the one-quarter transmission rate power in on one of the four 5 millisecond intervals in a zero-rate frame that is transmitted.

Those skilled in the art will readily recognize that a variety of codes can be used to implement the preselected or predetermined code. Basically, any known code that can be readily correlated with in the given communication system design, and possesses well known properties may be useful for this application. However, the preferred embodiment of the invention is for use in CDMA communication systems. As discussed above, in a typical CDMA spread-spectrum system unique orthogonal "channelizing" codes are used to create orthogonal code channels for user terminals on the forward link. Walsh functions, or equivalent codes, are generally used to implement the channelizing codes. Therefore a very efficient or preferred technique to implement the present invention is to use the Walsh 0 code available in such systems from the pilot channel being sent on the forward link, especially since synchronization and timing are being acquired using the pilot signal and system timing can easily be maintained.

The system and method of the invention detect the zero-rate frame on the reverse link by comparing a scaled version of the signal energy in the cold zone with a scaled version of the signal energy in the hot zone. Since the location of the hot zone is predetermined pseudo-randomly, the gateway receiver "knows" when it is transmitted. The gateway receiver compares the energy received for preselected orthogonal code, here Walsh code 0, in the hot zone and the energy received in the cold zone. In the case of a zero-rate frame, the energy in the hot zone is from the Walsh code 0 ($W_0$) transmitted in the hot zone. In the case of a non-zero-rate frame, the energy in the hot zone is from the normal communication maximum signal transmitted on the channel. In the case of a zero-rate frame, the energy in the cold zone is comprised of noise energy, since no signal is transmitted. In a non-zero-rate frame, the energy in the cold zone is from the normal communication signal transmitted on the channel. In the cold zone, the energy will depend on the rate. For each different non-zero rate a separate metric is used, scaled differently.

The energy detected in the hot and cold zones are compared to detect a zero-rate frame. If the difference between the energy for Walsh code 0 in the hot zone and the energy received in the cold zone is large, a zero-rate frame is declared on the reverse link. If the difference is small then a non-zero-rate frame is declared. Since fading on the channel is usually relatively slow compared to the 20 millisecond frame interval, zero-rate frames can be detected on the reverse link.

In a preferred embodiment, the relationship between hot and cold zone energy is established by subtracting scaled energy in the 15 millisecond cold zones from the energy in the hot zone. A ratio or other mathematical relationship between the hot and cold zone energies would be equivalent to the preferred embodiment. In a preferred embodiment, the quantity that is compared to the threshold is given by:

$$C_1 E_C - C_2 E_H$$

where $E_C$ is the energy in the cold zone, $E_H$ is the energy in the hot zone, and $C_1$ and $C_2$ are constants.

Figure 7:
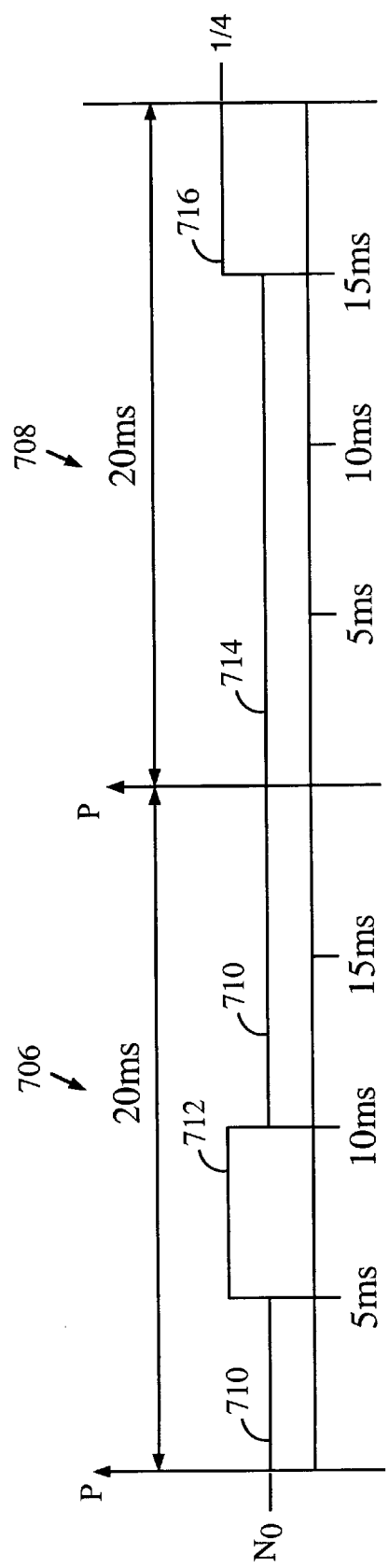
FIG. 7 depicts exemplary reverse link zero-rate communications frames.

FIG. 7 illustrates a preferred embodiment of a reverse link zero-rate frame. Frames 706 and 708 are examples of zero-rate frames on the reverse link. Portions 710 and 714 of the zero-rate frames 706, 708 are the cold zones. Note that cold zones 710, 714 contain noise only. The 5 millisecond periods 712 and 716 are the hot zones during which Walsh symbols 0 ($W_0$) are transmitted at the 2400 bps rate at the corresponding one-quarter rate transmission power. Cold zones 710, 714 and hot zones 712, 716 comprise an entire 20 millisecond frame.

Figure 8:
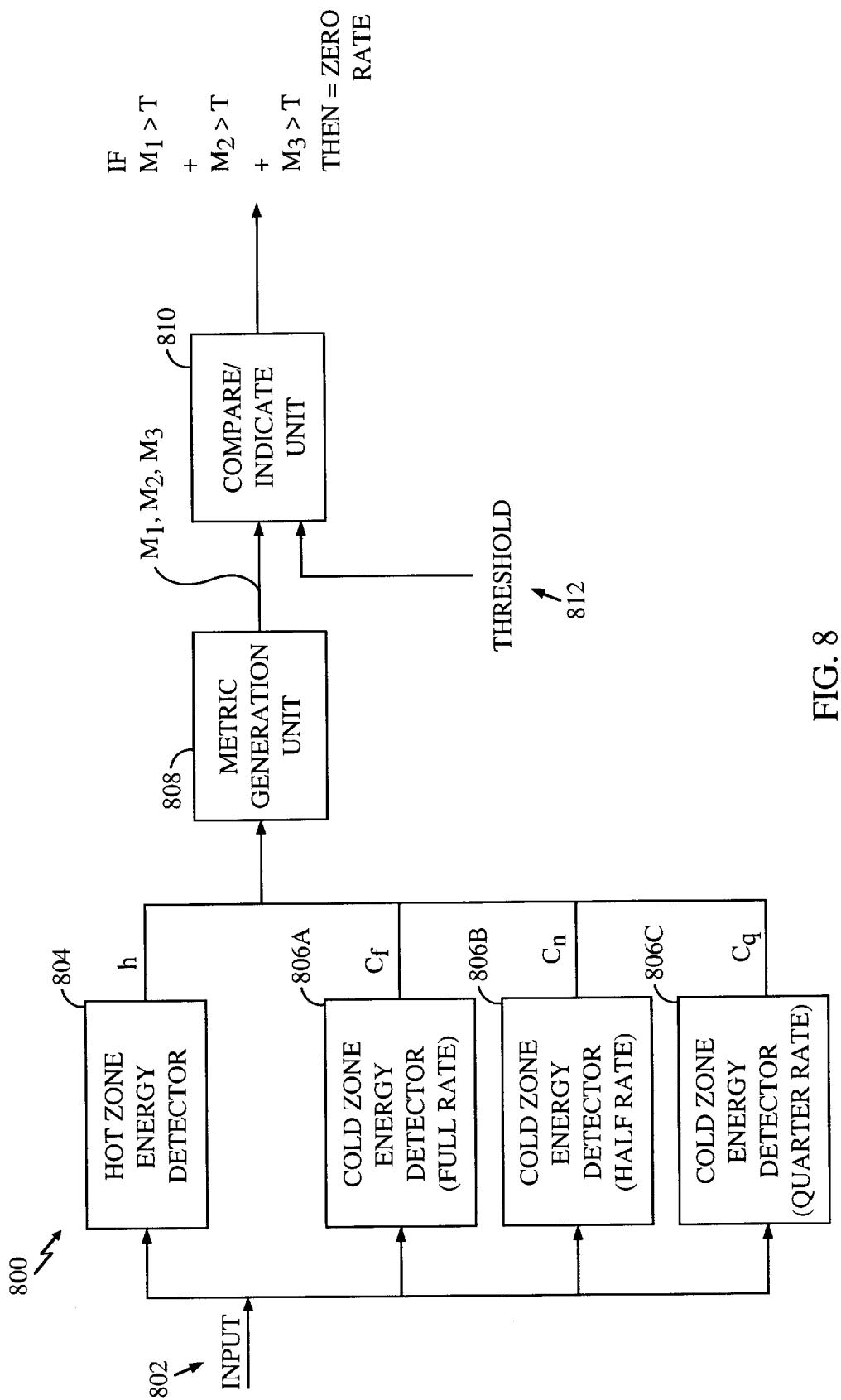
FIG. 8 is a block diagram of an exemplary reverse link zero-rate frame detector.

FIG. 8 illustrates a reverse link zero-rate frame detector 800. In a preferred embodiment, a reverse link zero-rate frame detector 800 is located in each of digital data receivers 316A–316N of the gateway transceiver 300. Input 802 is the reverse link signal input. Hot zone energy detector 804 determines the energy levels in the frame portions that correspond to hot zones 712 and 716. Cold zone energy detectors 806a, 806b, and 806c determine the energy levels in the frame portions that correspond to cold zones 710 and 714.

Since the location of hot zones 712, 716 are determined pseudo-randomly, the location of the hot zone in each zero-rate frame is known. In a preferred embodiment, each cold zone energy detector 806 determines the highest energy in the three 5 millisecond intervals in the cold zone and outputs that particular energy value. After the hot and cold zone energies are determined by hot and cold zone energy detectors 804, 806, metric generation unit 808 scales the cold zone energies and determines the difference between them and the hot zone energy to generate one or more metrics. In a preferred embodiment, the reverse link metrics are defined by:

$$M_1 = M_F = (\alpha_F \cdot C_F) - E_H$$

$$M_2 = M_H = (\alpha_H \cdot C_H) - E_H$$

$$M_3 = M_Q = (\alpha_Q \cdot C_Q) - E_H$$

where $C_F$, $C_H$, and $C_Q$ are the full, half, and quarter rate cold zone energies, respectively, used to determine $M_F$, $M_H$, $M_Q$ the full, half, and quarter rate metrics, respectively, and $\alpha_F$, $\alpha_H$, $\alpha_Q$ are the appropriate scaling factors used for each of the corresponding cold zones.

After the metrics are generated by metric generation unit 808, the compare/indicate unit 810 compares the metrics with a predetermined threshold 812. The optimum value of predetermined threshold 812 depends on the particular system in which the present invention is used. Thus, the value of predetermined threshold 812 is implementation-specific. The preferred or optimum value of predetermined threshold 812 is defined to avoid erroneously detecting a zero-rate frame with high probability while still being able to detect zero-rate frames reliably. If the threshold is set too high the probability of erroneously detecting a zero-rate frame is low, but the probability of detecting a zero-rate frame is also decreased. Conversely, if the threshold is set too low, the probability of erroneously detecting a zero-rate frame will be high. In a preferred embodiment, a zero-rate frame is declared when all of the metrics exceed the threshold, that is, when the following equations are satisfied:

$$M_1 > T$$

$$M_2 > T$$

$$M_3 > T$$

where T is predetermined threshold 812. Other methods of comparison, however, can be used and are recognized as equivalents by those of skill in the relevant art.

If the metrics exceed predetermined threshold 812, then the compare/indicate unit 810 indicates that a zero-rate frame has been received. If any metric falls below predetermined threshold 812, the compare/indicate unit 810 indicates that a non-zero-rate frame has been received.

Figure 9:
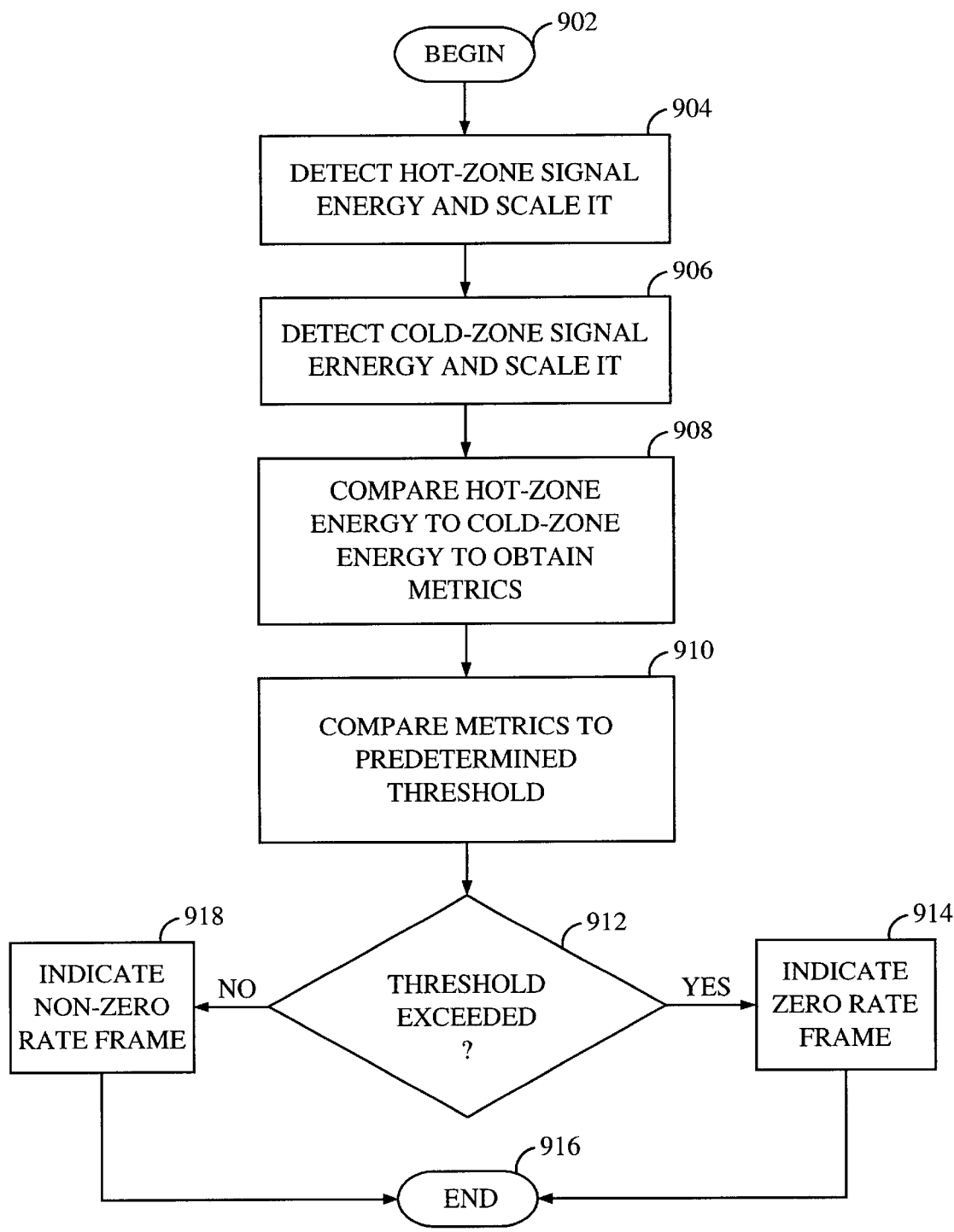
FIG. 9 is a flow chart depicting the method of detecting zero-rate frames on the forward link.

FIG. 9 illustrates the process for detecting a reverse link zero-rate frame. The process begins at step 902 where the reverse link channel signal is received. The hot zone signal energy for the reverse link is estimated at step 904 by hot zone energy detector 804. Next, the cold zone signal energy is estimated at step 906 by cold zone energy detector 806. After the hot and cold zone signal energies have been determined in steps 904 and 906, the hot zone signal energy is compared to the cold zone signal energies to obtain metrics ($M_1$, $M_2$, $M_3$) at step 908 by metric generation unit 808. After the metrics are computed in step 908, the metrics are compared to predetermined threshold 812 at step 910 by compare/indicate unit 810. Compare/indicate unit 810 then determines whether the metrics determined in step 908 exceed predetermined threshold 812 at step 912. If the metrics exceed predetermined threshold 812, then compare/indicate unit 810 indicates a zero-rate frame at step 914. If the metrics do not exceed the predetermined threshold, then compare/indicate unit 810 indicates a non-zero-rate frame at step 918. After the indication of a zero or non-zero-rate frame at steps 914 or 918 the process ends at step 916.

Figure 10:
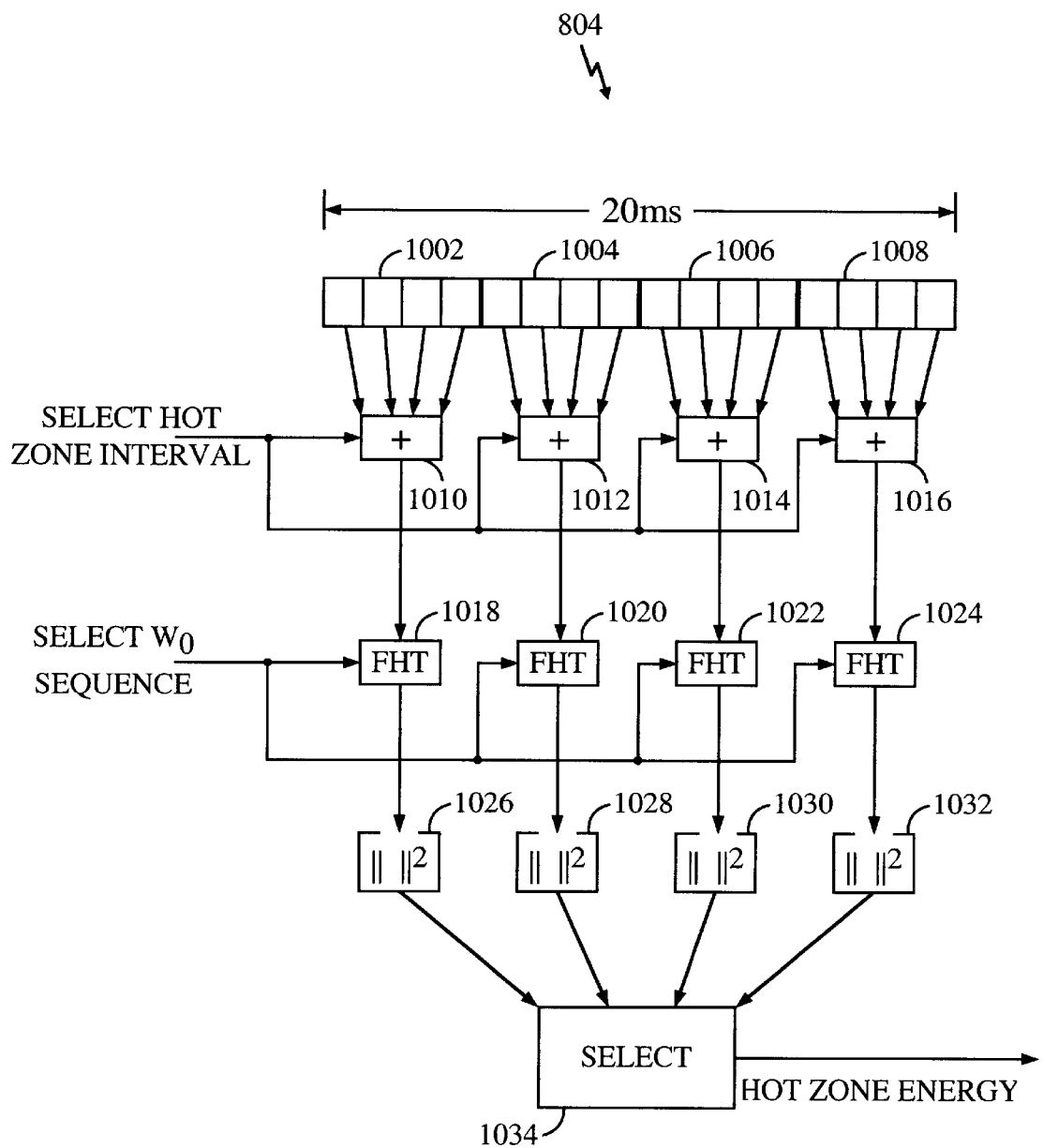
FIGS. 10–11 are detailed diagrams of hot and cold zone energy detectors.

FIG. 10 illustrates a hot zone energy detector 804 in further detail. Bits in each of the 5 millisecond intervals 1002–1008 in the 20 millisecond frame are accumulated by accumulators 1010–1016. Since the location of the hot zone is determined pseudo-randomly, the gateway receiver "knows" the 5 millisecond interval during which the hot zone is transmitted. The hot zone interval can be selected, therefore, from one of the four 5 millisecond intervals 1002–1008 in the frame. The accumulated signals are then input to Fast Hadamard transform units (FHTs) 1018–1024. FHTs 1018–1024 are well known in the spread spectrum communications art. The FHTs 1018–1024 determine the correlation between the input signal and all of the Walsh symbols. Since the hot zone is modulated with the Walsh code 0 ($W_o$) (or other preselected code), the Walsh symbol 0 ($W_o$) is selected in the FHTs 1018–1024. The correlation value for the selected hot zone interval is then output from the FHTs 1018–1024 to squaring units 1026–1032 compute the energy for the selected 5 millisecond interval. The energy is then output from the squaring units 1026–1032 to a selecting unit 1034 whose output is simply the energy of the selected hot zone interval. The hot zone interval energy is then output at element 1034.

Figure 11:
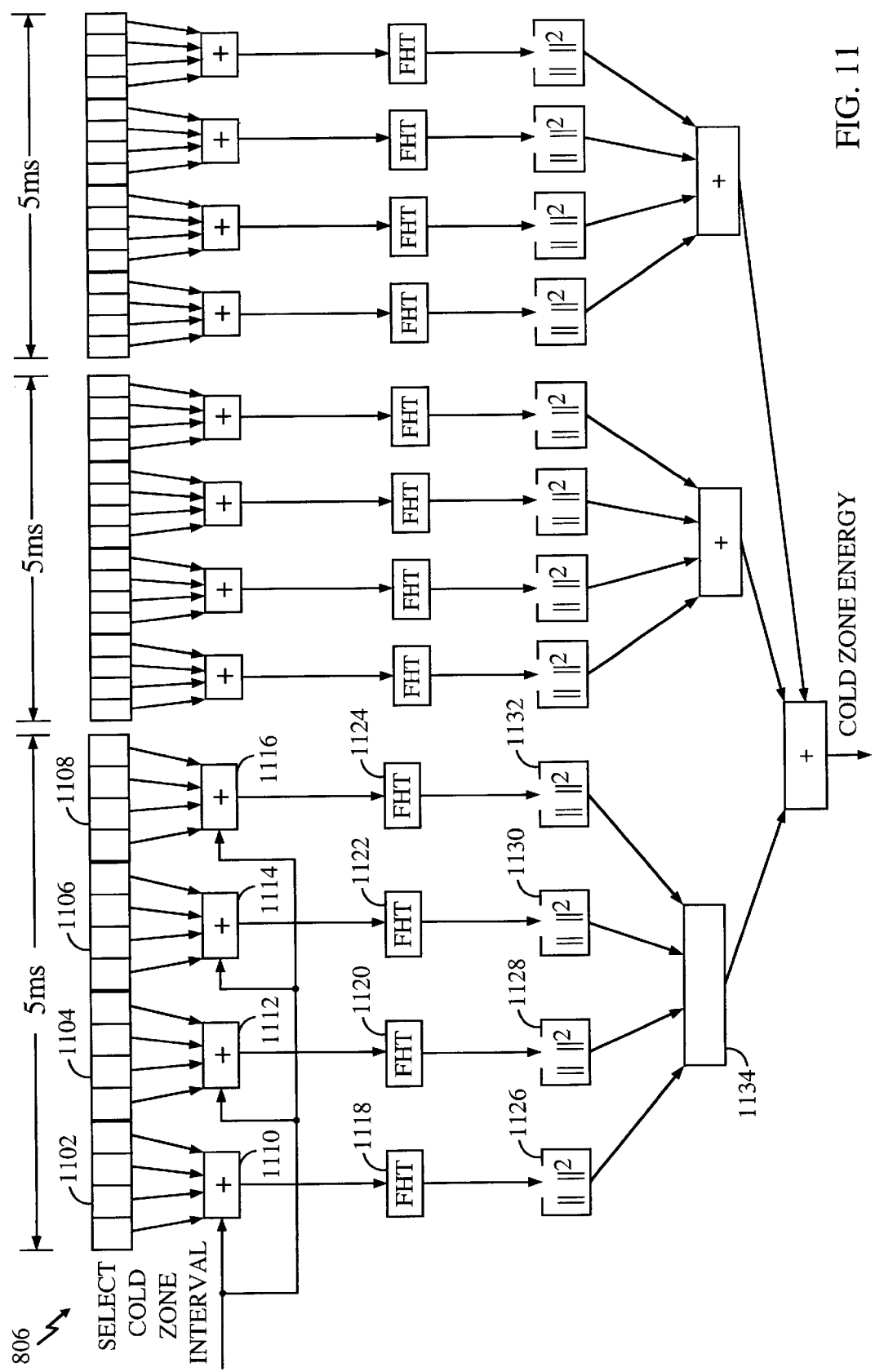

FIG. 11 illustrates the cold zone energy detector 806c (quarter rate) in more detail. Bits are accumulated from each of the 5 millisecond intervals 1102–1108 in accumulators 1110–1116. Since the location of the hot zone is determined pseudo-randomly, the gateway receiver "knows" the 5 millisecond interval during which the hot zone is transmitted. Thus, the cold zone intervals are collected from the rest of the four 5 millisecond intervals 1102–1108 in the frame. The accumulated signals from accumulators 1110–1116 are then input to Fast Hadamard Transform units (FHTs) 1118–1124. Signals from the three cold zone 5 millisecond intervals are demodulated by FHTs 1118–1124 and the winning correlation values are output from FHTs 1118–11124 to squaring units 1126–1132. Squaring units 1126–1132 calculate the cold zone energy from the winning correlation values produced by FHTs 1118–1124. In a preferred embodiment, the maximum energy out of the three code zone 5 millisecond intervals is selected by selection unit 1134. This maximum cold zone energy is then given to metric generation unit 808 for computation of the hot and cold zone energy metrics.

V. CONCLUSION

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A method for detecting a zero-rate traffic channel, comprising the steps of:
   receiving a pilot channel frame and a traffic channel frame;
   measuring an energy of said traffic channel frame;
   measuring an energy of said pilot channel frame;
   comparing said pilot channel frame energy to said traffic channel frame energy to obtain a metric by computing a ratio of said traffic channel frame energy to said pilot channel frame energy;
   comparing said metric with a predetermined threshold to obtain a result by comparing the magnitude of said metric to the magnitude of said predetermined threshold, said predetermined threshold based on the probability of detection of a transmitted zero-rate traffic channel frame and the probability of erroneously detecting a zero-rate traffic channel frame; and
   indicating whether a zero-rate traffic channel frame has been received based on said result.

2. The method of claim 1, wherein said indicating step comprises the step of indicating that a zero-rate traffic channel frame has been received when the magnitude of said predetermined threshold exceeds the magnitude of said metric.

3. A system for detecting a zero-rate traffic channel, comprising:
   means for receiving a pilot channel frame and a traffic channel frame;
   means for measuring an energy of said traffic channel frame;
   means for measuring an energy of said pilot channel frame;
   means for comparing said pilot channel frame energy to said traffic channel frame energy to obtain a metric, comprising means for computing a ratio of said traffic channel frame energy to said pilot channel frame energy;

means for comparing said metric with a predetermined threshold to obtain a result, comprising means for comparing the magnitude of said metric to the magnitude of said predetermined threshold, said predetermined threshold based on the probability of detection of a transmitted zero-rate traffic channel frame and the probability of erroneously detecting a zero-rate traffic channel frame; and means for indicating whether a zero-rate traffic channel frame has been received based on said result.

4. The system of claim 3, wherein said means for indicating comprises means for indicating that a zero-rate traffic channel frame has been received when the magnitude of said predetermined threshold exceeds the magnitude of said metric.

5. A method for detecting a zero-rate traffic channel, comprising the steps of:

receiving a traffic channel frame having first and second portions;

measuring an energy of said first portion;

measuring an energy of said second portion;

comparing said energy of said first portion with said energy of said second portion to obtain a metric, comprising computing a weighted difference between said energy of said first portion said energy of said second portion;

comparing said metric with a predetermined threshold to obtain a result comprising the step of comparing said weighted difference to said predetermined threshold, said predetermined threshold based on the probability of detection of a transmitted zero-rate frame and the probability of erroneously detecting a zero-rate frame, to detect the presence of a zero-rate frame;

indicating whether a zero-rate traffic channel frame has been received based on said result.

6. The method of claim 5, wherein said indicating step comprises the step of:

indicating that a zero-rate traffic channel frame has been received when said weighted difference exceeds said predetermined threshold exceeds the magnitude of said metric.

7. A system for detecting a zero-rate traffic channel, comprising:

means for receiving a traffic channel frame having first and second portions;

means for measuring an energy of said first portion;

means for measuring an energy of said second portion;

means for comparing said energy of said first portion with said energy of said second portion to obtain a metric, comprising means for computing a weighted difference between said energy of said first portion said energy of said second portion;

means for comparing said metric with a predetermined threshold to obtain a result, comprising means for comparing said weighted difference to said predetermined threshold, said predetermined threshold based on the probability of detection of a transmitted zero-rate frame and the probability of erroneously detecting a zero-rate frame, to detect the presence of a zero-rate frame;

means for indicating whether a zero-rate traffic channel frame has been received based on said result.

8. The system of claim 7, wherein said means for indicating comprises means for indicating that a zero-rate traffic channel frame has been received when said weighted difference exceeds said predetermined threshold exceeds the magnitude of said metric.

* * * * *